(12) United States Patent
Costello et al.

(10) Patent No.: US 11,145,960 B2
(45) Date of Patent: Oct. 12, 2021

(54) TIP CLEARANCE SENSOR SYSTEM WITH AN INTEGRAL PATCH ANTENNA ARRAY

(71) Applicants: Rolls-Royce Corporation, Indianapolis, IN (US); Rolls-Royce North American Technologies Inc., Indianapolis, IN (US)

(72) Inventors: John Joseph Costello, Indianapolis, IN (US); Richard Joseph Skertic, Carmel, IN (US); Glen Steven Bishop, Indianapolis, IN (US); Geoffrey L. Gatton, Brownsburg, IN (US)

(73) Assignees: ROLLS-ROYCE NORTH AMERICAN TECHNOLOGIES INC., Indianapolis, IN (US); ROLLS-ROYCE CORPORATION, Indianapolis, IN (US)

( * ) Notice: Subject to any disclaimer, the term of this patent is extended or adjusted under 35 U.S.C. 154(b) by 107 days.

(21) Appl. No.: 16/285,896

(22) Filed: Feb. 26, 2019

(65) Prior Publication Data

US 2020/0274236 A1 Aug. 27, 2020

(51) Int. Cl.
*H01Q 1/28* (2006.01)
*F01D 17/02* (2006.01)
(Continued)

(52) U.S. Cl.
CPC ............. *H01Q 1/28* (2013.01); *F01D 11/14* (2013.01); *F01D 17/02* (2013.01); *F01D 25/005* (2013.01); *G01B 7/14* (2013.01); *H01Q 9/0407* (2013.01); *H01Q 21/065* (2013.01); *F05D 2270/80* (2013.01); *F05D 2300/6033* (2013.01)

(58) Field of Classification Search
CPC ... B29C 33/301; B29C 33/38; B29C 33/3835; B29C 33/302; B29C 33/3842; B29C 33/42; B29C 39/34; C08L 63/00; C08L 83/04; Y10T 428/24479
See application file for complete search history.

(56) References Cited

U.S. PATENT DOCUMENTS 4,804,905 A  2/1989 Ding et al.
4,818,948 A  4/1989 Dooley
(Continued)

FOREIGN PATENT DOCUMENTS

CN       107101600 A    8/2017
DE  10 2006 046 696 A1   4/2008
(Continued)

OTHER PUBLICATIONS

Andreas Linke-Diesinger, "Engine Air Systems," Systems of Commercial Turbofan Engines, An Introduction to Systems Functions, dated May 2008, pp. 23-47, published by Springer Science and Business Media, Berlin, Germany.
(Continued)

*Primary Examiner* — Monica C King
(74) *Attorney, Agent, or Firm* — Crowell & Moring LLP

(57) ABSTRACT

A patch antenna array sensor is provided. The patch antenna array sensor includes a ceramic matrix composite body in which a patch antenna array is embedded, wherein the patch antenna array sensor is configured to detect blade tip clearance or some other aspect of one or more blades in a gas turbine engine.

16 Claims, 5 Drawing Sheets

(51) Int. Cl.
  *F01D 11/14* (2006.01)
  *F01D 25/00* (2006.01)
  *H01Q 9/04* (2006.01)
  *H01Q 21/06* (2006.01)
  *G01B 7/14* (2006.01)

(56) References Cited

U.S. PATENT DOCUMENTS

| | | |
|---|---|---|
| 6,489,917 B2 | 12/2002 | Geisheimer et al. |
| 7,283,096 B2 | 10/2007 | Geisheimer et al. |
| 7,455,495 B2 | 11/2008 | Leogrande et al. |
| 7,637,656 B2 | 12/2009 | Billington et al. |
| 2005/0158511 A1 | 7/2005 | Sabol et al. |
| 2006/0056960 A1 | 3/2006 | Sabol et al. |
| 2011/0189440 A1* | 8/2011 | Appleby ............... B29C 33/301 428/156 |
| 2013/0068024 A1 | 3/2013 | Xu et al. |
| 2015/0323301 A1 | 11/2015 | Zhe et al. |

FOREIGN PATENT DOCUMENTS

| | | |
|---|---|---|
| EP | 2 169 345 B1 | 10/2015 |
| GB | 2 071 852 A | 9/1981 |

OTHER PUBLICATIONS

Scott B. Lattime et al., "Turbine Engine Clearance Control Systems: Current Practices and Future Directions," dated Sep. 2002, pp. 1-20, published by National Aeronautics and Space Administration, Glenn Research Center, Cleveland, Ohio.

Ahmed Fatthi Alsager, "Design and Analysis of Microstrip Patch Antenna Arrays," dated Jan. 2011, pp. 1-80, published by the University of Borås, Borås, Sweden.

\* cited by examiner

TIP CLEARANCE SENSOR SYSTEM WITH AN INTEGRAL PATCH ANTENNA ARRAY

TECHNICAL FIELD

This disclosure relates to sensors and, in particular, to blade tip sensors.

BACKGROUND

Present blade tip sensors suffer from a variety of drawbacks, limitations, and disadvantages. Accordingly, there is a need for inventive systems, methods, components, and apparatuses described herein.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

In one example, a patch antenna array sensor is provided. The patch antenna array sensor includes a ceramic matrix composite body in which a patch antenna array is embedded, wherein the patch antenna array sensor is configured to detect blade tip clearance or some other aspect of one or more blades in a gas turbine engine.

Figure 1:
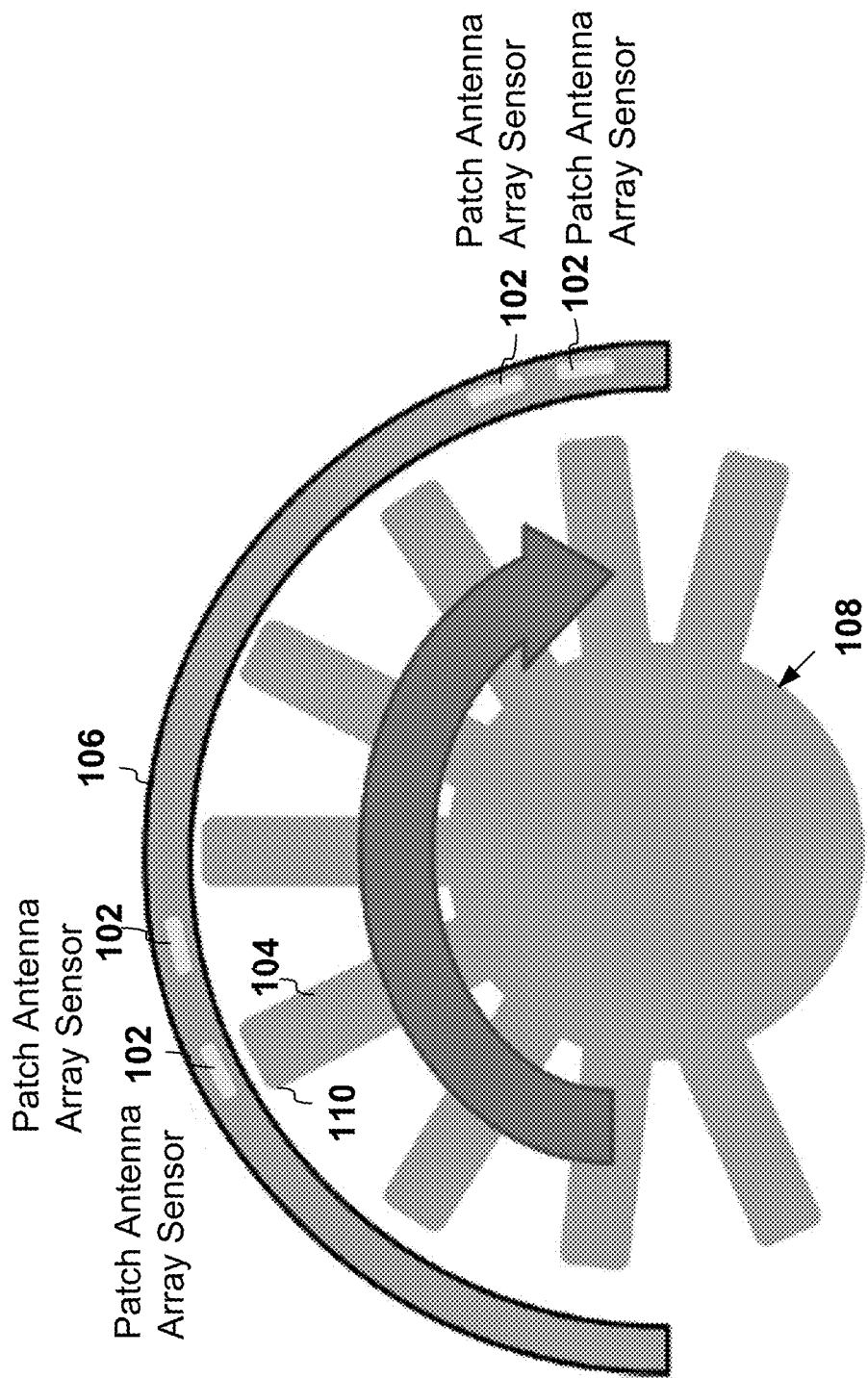
FIG. 1 is a cross-sectional view of a gas turbine engine that includes patch antenna array sensors integral to a ceramic matrix composite engine shroud.

FIG. 1 is a cross-sectional view of a gas turbine engine that includes patch antenna array sensors 102 integral to a ceramic matrix composite (CMC) engine shroud 106. The CMC engine shroud 106 comprises a CMC. CMC is a material comprising ceramic fibers embedded in a ceramic matrix. The matrix and the fibers may be made of any ceramic material. Carbon and carbon fibers may be considered a ceramic material. Each of the fibers may be a bundle or a tow of ceramic tiles. Alternatively or in addition the fibers may be individual and discrete fibers. The fibers in each bundle or tow may be braided or otherwise arranged. The fibers may comprise a material that is stable at temperatures above, for example, 1000 degrees Celsius. Examples of the fibers include zirconia, Carbon (C), silicon carbide (SiC), alumina ($Al_2O_3$), and mullite ($Al_2O_3$—$SiO_2$). Examples of the matrix materials include C, SiC, alumina, and mullite. Examples of the CMC include C/C, C/SiC, SiC/SiC, $Al_2O_3/Al_2O_3$, and Ox-Ox.

As used herein, a component is said to be integral to a ceramic matrix composite body if the component is included in the ceramic matrix composite body when the ceramic matrix composite body is formed from a porous preform by melt and/or vapor infiltration. More broadly, a component is said to be embedded in a ceramic matrix composite body (1) if the component is integral to the ceramic matrix composite body or (2) if the component is added to the ceramic matrix composite body after the ceramic matrix composite body is formed from a porous preform.

The patch antenna array sensors 102 are arranged at one or more locations around the CMC engine shroud 106. During operation of the gas turbine engine, blades 104 of a rotor 108 may rotate so that tips 110 of the blades 104 pass the patch antenna array sensors 102.

Figure 2:
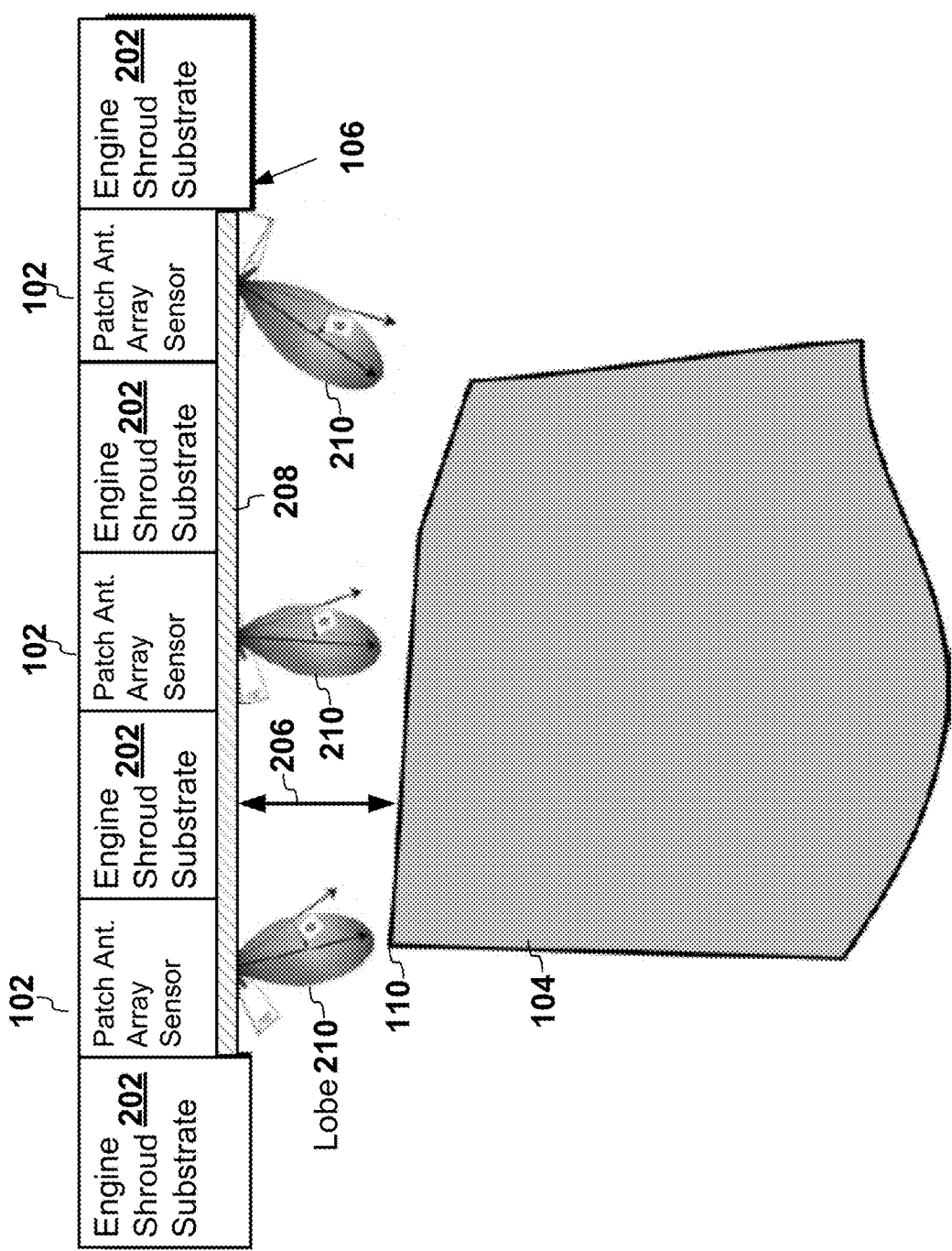
FIG. 2 is a cross-sectional view of the gas turbine engine taken in a plane parallel to the flow path.

The cross-sectional view of the gas turbine engine shown in FIG. 1 is of a cross-section taken in plane perpendicular to a flow path of a fluid that flows past the blades 104. In contrast, FIG. 2 is a cross-sectional view of the gas turbine engine taken in a plane parallel to the flow path. In FIG. 2, the blade tip 110 of one of the blades 104 is shown in proximity to the CMC engine shroud 106 and, in particular, in proximity a set of the patch antenna array sensors 102. The patch antenna array sensors 102 illustrated in FIG. 2 are distributed along a line parallel to the flow path. In the illustrated example, the CMC engine shroud 106 includes an engine shroud substrate 202 and the patch antenna array sensors 102, which are integral to the engine shroud substrate 202. In some examples, a portion of the engine shroud substrate 202 and/or a portion of patch antenna array sensors may include an abradable layer 208 facing the blade tip 110. A distance between the blade tip 110 and the abradable substrate 204 is referred to as tip clearance 206 or blade tip clearance. The blades 104 shown in FIGS. 1 and 2 may be included in a compressor section or a turbine section of a gas turbine engine. The CMC in the CMC engine shroud 106 may be a lower temperature CMC than the CMC in the compressor section. In some examples, depending on the conditions that the patch antenna array sensor 102 will ultimately be subjected to, the patch antenna array sensor 102 may be integral to and include a type of composite that includes organic material such as a carbon fiber composite.

Each of the patch antenna array sensors 102 includes a patch antenna array (not shown). A patch antenna array comprises two or more substantially flat antenna elements. Multiple patch antennas may form microstrip antennas by being located on a single substrate. The patch antenna may comprise a phased array in which the direction of an antenna signal beam, also referred to as a lobe 210, may be electronically controlled. For example, in FIG. 2, the lobe 210 generated by the patch antenna array sensor 102 that is upstream of the blade 104 relative to the flow path is angled downstream toward the blade 104 and radially inward. Similarly, the lobe 210 generated by the patch antenna array sensor 102 that is downstream of the blade 104 is angled upstream toward the blade 104 and radially inward. The lobe 210 that is generated by the patch antenna array sensor 102 located radially outward from the blade 104 may be directed radially inward toward the blade 104.

As shown in FIG. 1, for redundancy and accurate control over the tip clearance 206, three to four pairs of the patch antenna array sensors 102, for example, may be located circumferentially around the CMC engine shroud 106. Such an arrangement enables detection of engine casing deflection and, together with a tip clearance control system, enables maintaining concentricity of the CMC engine shroud 106 and the rotor 108, which includes the blades 104. Maintaining concentricity may improve fuel efficiency and decrease maintenance issues. Only a portion of the annular cross-section of the CMC engine shroud 106, only a subset of the blades 104, and only a subset of the patch antenna array sensors 102 are shown in FIG. 1. Additional or fewer patch antenna array sensors 102 than in the illustrated example may be located circumferentially around the CMC engine shroud 106.

Figure 3:
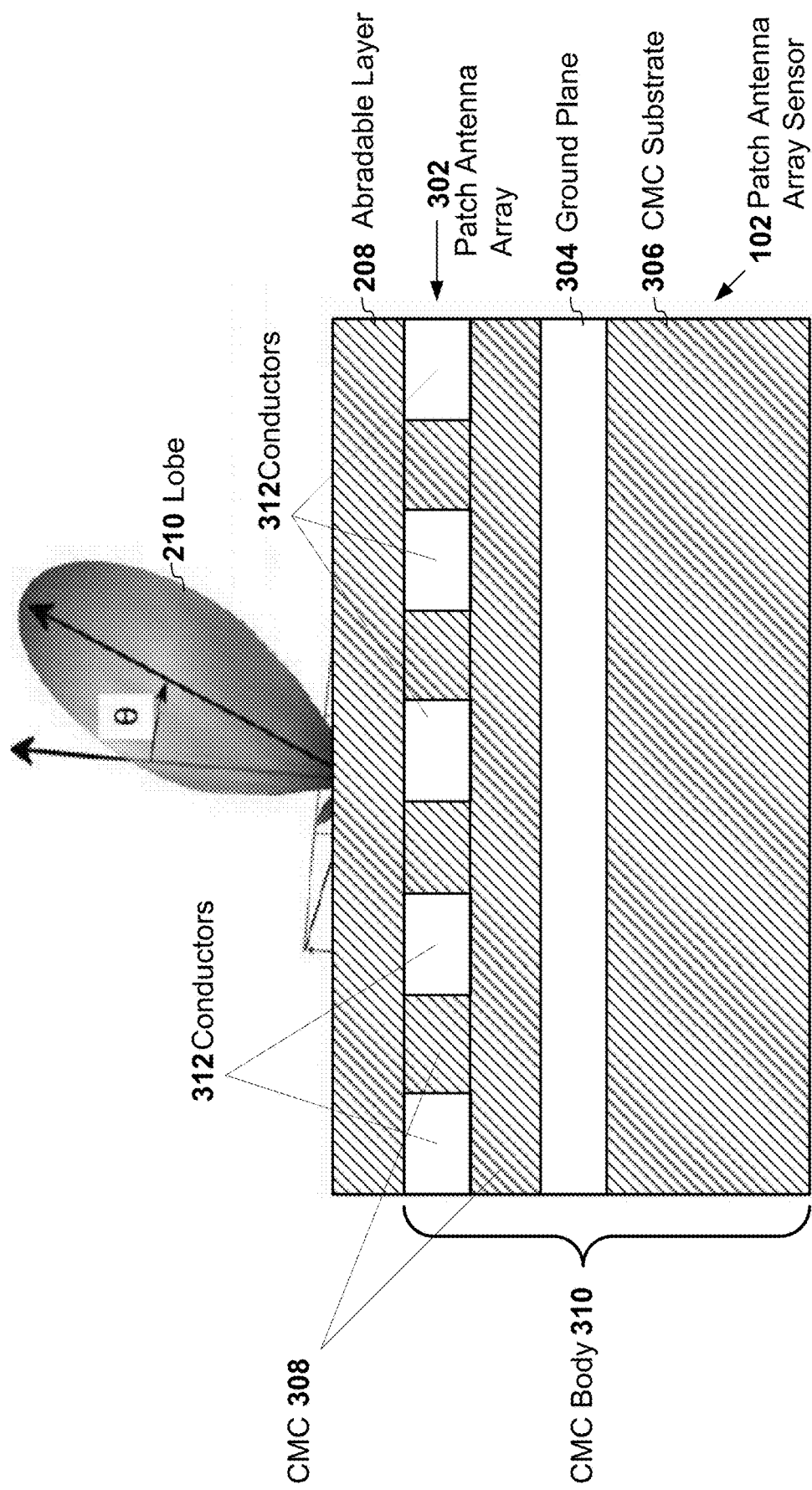
FIG. 3 is a cross-sectional view of an example of a patch antenna array sensor.

FIG. 3 is a cross-sectional view of an example of one of the patch antenna array sensors 102. The patch antenna array sensor 102 in the illustrated example includes the abradable layer 208 and a CMC body 310, where the CMC body 310 includes a patch antenna array 302, a ground plane 304, and a CMC substrate 306. FIG. 3 also shows an example of the lobe 210 that may radiate from the patch antenna array 302 of the patch antenna array sensor 102.

The abradable layer 208 may be a layer comprising an abradable material. The tip 110 of the blade 104 may initially wear away a portion of the abradable layer 208 so as to initially limit the tip clearance 206 to substantially zero without damaging the patch antenna array sensor 102 or the blade 104.

The patch antenna array 302 includes one or more conductors 312, five of which are shown in the illustrated example. One or more antenna elements of the patch antenna array 302 comprise the one or more conductors 312. The conductors 312 are embedded in CMC 308, and in some examples, are integral to the CMC 308. In some examples, the conductors 312 are embedded in the abradable material of the abradable layer 208 instead of, or in addition to, the CMC 308. Examples of the one or more conductors 312 include a metallic mesh, a metallic plate, and a single strand conductor. Each of the antenna elements formed by the conductors 312 is a patch antenna. The combination of the patch antennas forms a phased array antenna. In a phased array antenna, the lobe 210 is formed by shifting the phase of the signal emitted from each radiating patch antenna, which results in constructive and/or destructive interference so as to focus the lobe 210 in a target direction.

The patch antenna is a single-element resonant antenna. Once the frequency of an excitation signal for the patch antenna is set, then a radiation pattern, an input impedance, and other properties of the patch antenna may be correspondingly fixed. The patch antenna may be a square, a rectangle, a ring, a circle, or any other suitable shape. The thickness of each patch antenna is relatively thin, meaning substantially smaller than the wavelength ($\lambda_0$) of the excitation signal transmitted in free space. For example, the thickness of the patch antenna may be in a range of 0.01 to 0.05 times the free-space wavelength ($\lambda_0$). The one or more conductors 312 included in the patch antenna are located on a side of a non-conductive substrate, such as the CMC 308 located between the one or more conductors 312 and the ground plane 304. The patch antenna may include the non-conductive substrate and, in some example, the ground plane 304.

The ground plane 304 is a layer comprising one or more conductors that may represent ground for the patch antenna array 302. Alternatively or in addition, the ground plane 304 may improve antenna gain and may provide better control of the lobe 210. Alternatively or in addition, the ground plane 304 may form an electromagnetic shield for the patch antenna array 302. In some examples, the patch antenna array sensor 102 does not include the ground plane 304. Examples of the one or more conductors of the ground plane 304 include a metallic mesh and a metallic plate. The one or more conductors of the ground plane 304 may be embedded in, and in some examples integral to, the CMC 308.

The CMC substrate 306 may be any CMC layer on which the rest of the patch antenna array sensor 102 is built and/or affixed. The CMC substrate 306 comprises a CMC. The CMC 308 in which the patch antenna array 302 is embedded may be the same as, or different than, the CMC in the CMC substrate 306. In some examples, the CMC substrate 306 may be the CMC engine shroud 106 or a portion thereof.

Layers of the patch antenna array sensor 102 are arranged in the following order from the closest to the blade 104 to the furthest from blade 104: the abradable layer 208, the CMC 308 in which the patch antenna array 302 is embedded, the ground plane 304 if included, and the CMC substrate 306. As indicated above, the CMC 308 in which the patch antenna array 302 is embedded may be the same as the CMC substrate 306 in some examples. The patch antenna array sensor 102 may include additional, fewer, and/or different layers than illustrated in FIG. 3. The layers may be in any order suitable for the components of the patch antenna array sensor 102.

Figure 4:
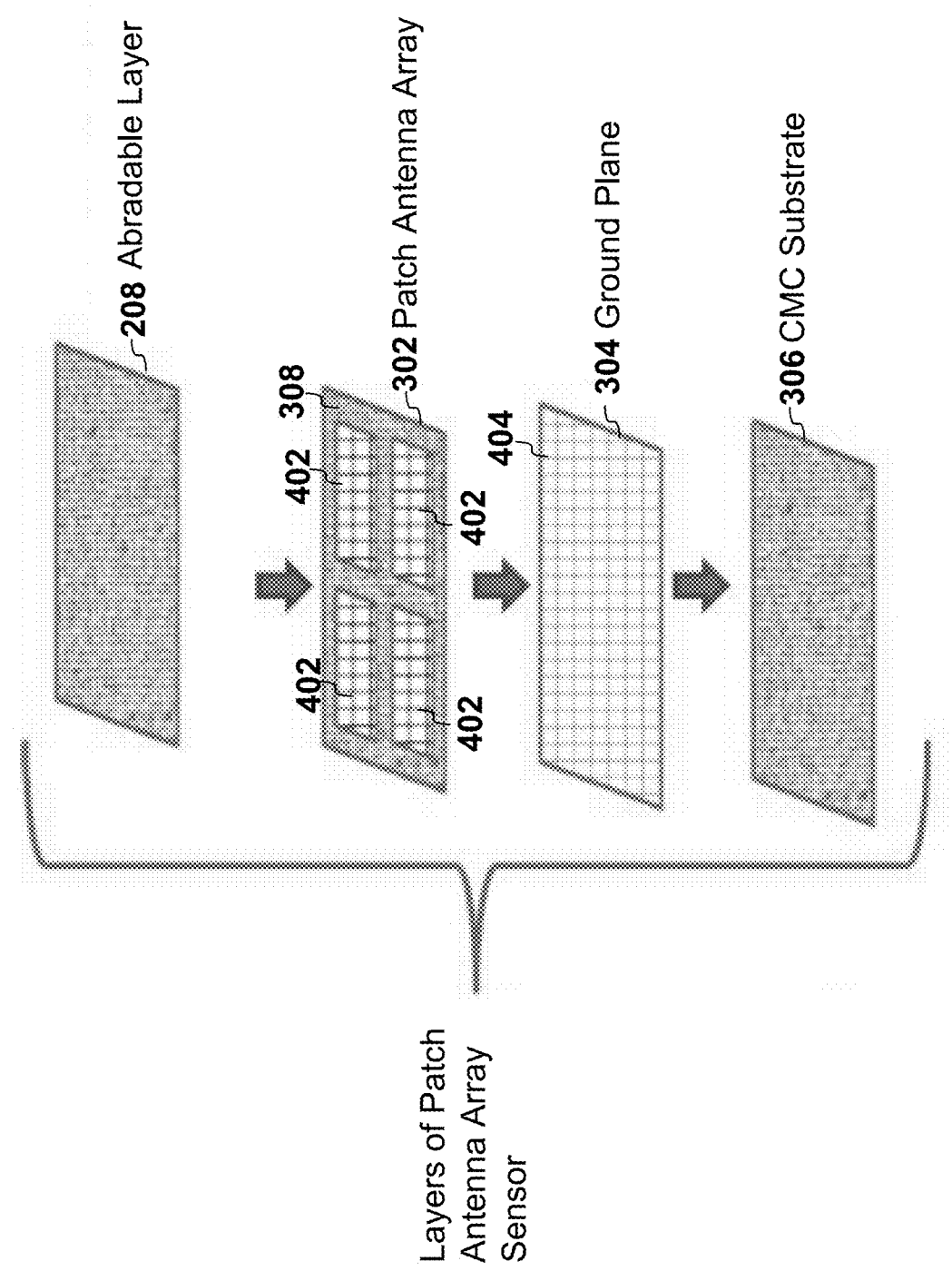
FIG. 4 illustrates an example of a method of joining individual layers of a patch antenna array sensor.

Two or more of the layers of the patch antenna array sensor 102 may be fully or partially created and then joined together. FIG. 4 illustrates an example of a method of joining individual layers. The abradable layer 208 is formed from an abradable material having a relative permittivity $\varepsilon_r$, also known as a dielectric constant) of, for example, approximately 1 at operational temperature and frequency. The patch antenna array 302 is formed or embedded in the CMC 308. In the illustrated example, the patch antenna array 302 includes four antenna elements 402 comprising a metal mesh. The ground plane 304 comprises a metal mesh 404. The CMC substrate 306 comprises a CMC that has a relative permittivity $\varepsilon_r$ of, for example, approximately 3 to 5 at operational temperature. The individual layers are bonded together to form the patch antenna array sensor 102. Examples of bonding include friction bonding, chemical bonding, and brazing.

Alternatively or in addition, two or more of the layers of the patch antenna array sensor 102 may be formed during the formation of the CMC 308 included in the CMC body 310. For example, the layers or a subset thereof may be formed by assembling a porous ceramic preform having layers, and then forming the porous ceramic preform into the CMC body 310 by melt and/or vapor infiltration. Metal components, such as the conductors of the patch antenna array 302, may be included in the porous ceramic preform prior to infiltration and/or added after the CMC body 310 (or one or more portions thereof) is formed.

In some examples, one or more of the conductors 312 of the patch antenna array 302, one or more of the conductors of the ground plane 304, and/or electrodes (not shown) to patch antenna array 302 or to the ground plane 304 may be formed by depositing a layer of metal, for example via chemical vapor deposition, and then using chemical etching to remove any portion of the layer of metal that is not desired.

Figure 5:
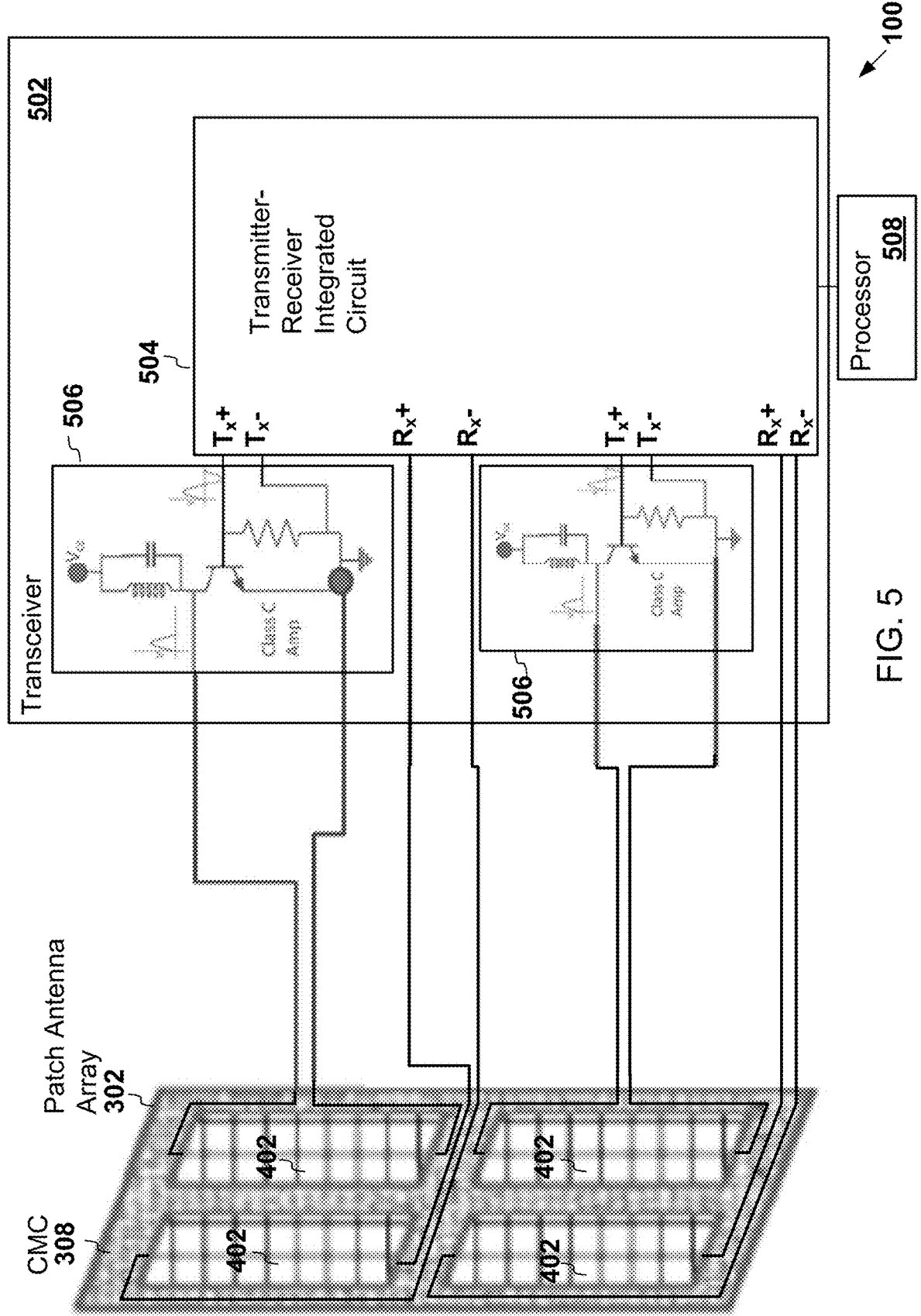
FIG. 5 illustrates an example of a tip clearance sensor system.

FIG. 5 illustrates an example of a tip clearance sensor system 100. The system 100 includes the patch antenna array 302, a transceiver 502, and a processor 508. Although not shown in FIG. 5, the patch antenna array 302 is embedded in the CMC body 310 and is included in the patch antenna array sensor 102. The patch antenna array 302 shown in FIG. 5 includes four antenna elements 402 embedded in the CMC 308. On one hand, two of the antenna elements 402 shown on the left are each configured to receive a signal that may be detected as a current through, or a voltage across, lines $R_x+$ and $R_x-$, which electrically couple the patch antenna array 302 to the transceiver 502. These two elements are passive antenna elements. On the other hand, two of the antenna elements 402 shown on the right are each configured to transmit a signal provided as current through, or voltage across, lines $T_x+$ and $T_x-$, which electrically couple the patch antenna array 302 to the transceiver 502. These two antenna elements are active antenna elements. Electrodes embedded in the CMC 308 of the patch antenna array 302 electrically couple each of the antenna elements 402 to respective sets of the lines $T_x+$ and $T_x-$ or $R_x+$ and $R_x-$. The patch antenna array 302 may include any number of active and/or passive antenna elements.

The transceiver 502 may be located in a different location than the patch antenna array 302 is located. For example, the transceiver 502 may be located somewhere else in the gas turbine engine or aircraft that generally experiences lower temperatures than the patch antenna array 302 experiences. The transceiver 502 may be any device configured to generate and transmit an excitation signal to the lines $T_x+$ and $T_x-$, and to receive measurement signals from lines $R_x+$ and $R_x-$. In the example illustrated in FIG. 5, the transceiver 502 is configured to generate and transmit two excitation signals independently of each other and to receive two measurement signals independently of each other. The excitation signal may have a predetermined frequency or set of frequencies. The excitation signal may be sine wave, a sawtooth wave, a square wave, a pulse signal, or any other shaped signal.

In the example shown in FIG. 5, the transceiver 502 includes a radio frequency transmitter-receiver integrated circuit 504 ("transceiver IC") and, for each set of transmission lines $T_x+$ and $T_x-$, a Class C amplifier 506, such as a Gallium Nitride or Silicon Carbide device. The transceiver IC 504 is configured to generate and transmit the excitation signal over lines $T_x+$ and $T_x-$ to the patch antenna array 302. The excitation signal is fed through the Class C amplifier 506 to drive the patch antenna array 302 at a relatively high power and relatively high frequency, and to naturally modulate a carrier frequency, such as 100 MHz. The excitation signal may be frequency modulated (FM), amplitude modulated (AM), or phase modulated. In other examples, the transceiver IC 504 includes a built-in Class C amplifier and the Class C amplifier 506 that is discrete from the transceiver IC 504 in the illustrated example is not included in the transceiver 502. In still other examples, the transceiver 502 generates and transmits a non-truncated excitation signal and no Class C amplifier is included in the transceiver 502. The transceiver IC 504 is also configured to receive the measurement signals from each set of the receiving lines $R_x+$ and $R_x-$. The transceiver IC 504 may include a DAC (digital to analog converter), such as a sigma delta analog to digital convertor, that converts the received measurement signals into digital signals. An example of the transceiver IC 504 is a product from Analog Devices called the Integrated Dual RF Tx, Rx, and Observation Rx, model ADRV9009. Model ADRV9009, which has a relatively wide frequency range and relatively wide bandwidth as a single chip radio. For example, the transceiver 502 may operate in a 75 MHz to 6 GHz frequency band or any other suitable frequency band. For example, the excitation signal may have a frequency of 5 GHz with a variable phase angle, and/or any other frequency within the operable frequency band. At 5 GHz, the tip clearance sensor 100 has over-sampling capability and high enough resolution of the blade tip 110 to detect relatively large tip clearances as well as tip clearances down to a fraction of 1 mm.

In some examples, the Class C amplifier 506 may be compatible with a 75 MHz to 6 GHz carrier frequency of the Analog Devices ADRV9009 when the Analog Devices ADRV9009 is selected as the transceiver IC 504. The Class C amplifier 506 may also comply with power limits imposed by the Federal Communications Commission (FCC), which limit radiated emissions to a 15 to 50 milliwatt limit. Selecting 5 GHz as the carrier frequency may provide sufficient resolution of the blade tip 110 and sufficient over-sampling capability in some configurations. In some examples, the excitation signal may be injected at multiple frequencies. Signals at the multiple frequencies may be superimposed on the same input nodes, or time division multiplexing techniques may be implemented. Any combination of frequencies for the excitation signal may be selected as long as the as the transceiver IC 504 has a high enough bandwidth to accurately decode the measurement signals.

The processor 508 and/or the transceiver 502 may be configured to set the frequency and/or shift the phase angle of the excitation signals to the antenna elements 402. By controlling the frequency and phase angle, the lobe 210 emanating from each patch antenna array 302 may be focused on a respective area of the blades 104 passing by the respective patch antenna array 302.

The processor 508, such as a digital signal processor (DSP) like an Analog Devices Tiger-Shark 32-bit floating point DSP, may be configured to process the measurement signal to determine the tip clearance 206 and/or an indication of the shape and wear of the blades 104. Examples of the processor 508 may include a general processor, a central processing unit, a microcontroller, an engine controller, an application specific integrated circuit (ASIC), a digital signal processor, a field programmable gate array (FPGA), a digital circuit, and/or an analog circuit. For example, the processor 508 may include one or more FPGA integrated circuit chips configured as a digital filter, decimator, and Direct Memory Access (DMA). The processor 508 may be one or more devices operable to execute logic. In some examples, the logic may include computer executable instructions or computer code embodied in memory that when executed by the processor 508, cause the processor to perform the features implemented by the logic. The computer code may include instructions executable with the processor 508.

Communication between the processor 508 and other systems such as an active clearance control system (not shown) may be performed over any communications network. Examples of the communications network may include ARINC-664 (AFDX, based on Ethernet), Bosch CAN bus, ARINC-429, and/or MIL-STD-1553B. The communications may be used for reporting blade clearance, speed, wear conditions, and/or any other information. The communications standard selected may be application specific.

During operation of the tip clearance sensor system 100, the processor 508 may control the frequency and/or phase angle to focus the lobe 210 emanating from each patch antenna array 302 on a respective area of the blades 104 passing by the respective patch antenna array 302. An example of this may be seen in FIG. 2. Any passive antenna element in the antenna elements 402 may receive a corresponding reflection off of the blades 104. The transceiver 502 and/or the processor 508 may process the measurement signal received from one or more of the passive antenna elements in order to determine a distance between a source, such as the patch antenna array 302 that transmitted the excitation signal, and a surface, such as the surface of the blade 104 that caused the reflection. For example, the distance between the source and the surface may be determined based on the modulation of the reflected signal as compared to the modulation of the transmitted excitation signal. The shorter the distance between the source and the surface, the more the modulation may increase (in order words, the modulation has a greater amplitude, greater frequency shift, or greater phase shift in the reflected signal as compared to the transmitted excitation signal). For example, if amplitude modulation is used, then the distance between the source and the surface may be determined from a ratio of the amplitude of the signal that is modulated in the excitation signal and the amplitude of the modulated signal in the measurement signal. Alternatively or in addition, Fourier transform techniques may detect frequency or phase changes in frequency or phase modulated excitation and measurement signals. The position of the patch antenna array 302 that transmits the excitation signal (and the patch antenna array 102 that includes the patch antenna array 302) relative to an expected location of the surface of the blade 104 may predetermined. As a result, any difference between the measured distance between the source and the surface and the expected distance to the surface may provide an indication of wear at that point in the surface. Accordingly, the processor 508 may determine the shape and/or wear of the blades 104 and/or the tip 110 of the blades 104 from the measurement signal.

In some examples, multiple excitation signals may have different frequencies from each other. The system 100 may compensate for parasitic effects (capacitive and inductive) by analyzing the difference in the responses detected at different excitation frequencies.

Blade creep (also referred to as blade wear) may be detected by the system 100. New blade tips may have a rectangular geometry when initially installed. After extended engine operation, such as 5,000 hours, the geometry may resemble a rounded butter-knife blade. Engine temperature and abrasive or corrosive material in engine inlet air will vary greatly based on the engine operating environment and engine load. The system 100 may be able to detect the loss of material from the blade tip 110 up to two centimeters inward, for example, with a resolution of approximately 1 percent (where 100 percent represents all of a initially installed blade is present, and zero percent represents a missing blade). If any of the blades 104 has a worn portion detected by the system 100, then a maintenance system may identify which of the blades 104 has been worn beyond a target limit indicating a maintenance action is to be taken, such as replacing the worn blade. More generally, the system 100 may determine blade health, blade deterioration, blade shape for detecting sand buildup, and even blade affects due to ash ingestion, debris, or other contaminants. Consequently, the system 100 may provide improved capabilities for engine health management, prognostics, and may reduce maintenance burden.

Alternatively or in addition, engine speed may be measured by, for example, timing the detection of the number of the blades 104 in one shaft resolution. The processor 508 may invert the time taken to detect the blades 104 in order to obtain the Revolutions per Minute (RPM) of the shaft and/or the frequency of the shaft's rotation.

Alternatively or in addition, the system 100 may detect engine torque. The use of multiple patch antenna array sensors 102 or a combination of the patch antenna array sensor 102 and a different type of rotational sensor—one at the front of the shaft and one at the rear of a shaft in the gas turbine engine—enable detection of speed signal phase changes. Phase may be measured at the trailing edge of blades 104 because less wear may be expected at the trailing edge of the blades. This phase change may be linearly proportional to Torque (at stresses less than yield strength). Including temperature compensation may improve torque accuracy from 5 percent to 0.1 percent.

Alternatively or in addition, the system 100 may detect a break in the shaft of the gas turbine engine. Detecting the speed and torque may be the basis of detecting different speeds at the front than at the rear of a shaft. The shaft break detection may be detected, for example, within 1 to 10 milliseconds of the break with 90 percent or better confidence.

Alternatively or in addition, the system 100 may detect over-speed conditions. An over-speed condition may be encountered when, for example, the engine speed is 120 to 140 percent of a threshold speed. Detection of speeds exceeding 120 to 140 percent of the threshold speed (with 1 percent resolution) enables fuel cut-off before the gas turbine engine self-destructs. The over-speed detection may be detected within 1 to 10 milliseconds of the over-speed condition, with a 90 percent or better confidence. The processor 508 may send a request to disable fuel delivery in response to detecting an over-speed condition.

Alternatively or in addition, the system 100 may detect bearing wear. If the patch antenna array sensors 102 are located circumferentially around the engine shroud 106, bearing wear may be measured as the differential blade gap opens up due to aging of the bearings.

The system 100 may be a lower cost than more complicated electronic systems such as microwave or optical speed measurement systems. The patch antenna array sensor 102 may be integrated into the engine shroud 106 even if the engine shroud 106 includes SiC—SiC, CMC-CMC, and other high temperature materials.

The gas turbine engine may take a variety of forms in various embodiments. For example, the gas turbine engine may be an axial flow engine. The gas turbine engine may have multiple spools and/or may be a centrifugal or mixed centrifugal/axial flow engine. In some forms, the gas turbine engine may be a turboprop, a turbofan, or a turboshaft engine. Furthermore, the gas turbine engine may be an adaptive cycle and/or variable cycle engine. Other variations are also contemplated.

The gas turbine engine may supply power to and/or provide propulsion of an aircraft. Examples of the aircraft may include a helicopter, an airplane, an unmanned space vehicle, a fixed wing vehicle, a variable wing vehicle, a rotary wing vehicle, an unmanned combat aerial vehicle, a tailless aircraft, a hover craft, and any other airborne and/or extraterrestrial (spacecraft) vehicle. Alternatively or in addition, the gas turbine engine may be utilized in a configuration unrelated to an aircraft such as, for example, an industrial application, an energy application, a power plant, a pumping set, a marine application (for example, for naval propulsion), a weapon system, a security system, a perimeter defense or security system.

Each component may include additional, different, or fewer components. For example, the patch antenna array sensor 102 may include the patch antenna array 302 embedded in the CMC 308 but not the ground plane 304 and not the CMC substrate 306. As another example, the transceiver 502 and the processor 508 may be included in a single FPGA and/or a single integrated circuit. In still another example, the patch antenna array 302 in a first one of the patch antenna array sensors 102 may include two or more active antenna elements 402 and no passive antenna elements 402. Instead, one or more passive antenna elements 402 in a second one of the patch antenna array sensors 102 may receive a signal transmitted from the first one of the patch antenna array sensors 102.

The system 100 may be implemented with additional, different, or fewer components. For example, the system 100 may include cabling that electrically couples the patch antenna array 302 to the transceiver 502. Alternatively or in addition, the system 100 may include multiple transceivers and multiple patch antenna array sensors 102.

The logic illustrated in the flow diagrams may include additional, different, or fewer operations than illustrated. For example, the patch antenna array 302 may be attached directly to the CMC substrate 306 instead of to the ground plane 304 as illustrated in FIG. 4. The operations illustrated may be performed in an order different than illustrated.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects. A first aspect relates to a patch antenna array sensor comprising: a ceramic matrix composite body in which a patch antenna array is embedded, wherein the patch antenna array sensor is configured to detect blade tip clearance in a gas turbine engine.

A second aspect relates to the patch antenna array sensor of aspect 1, wherein the patch antenna array comprises a plurality of metallic antenna elements embedded in ceramic matrix material.

A third aspect relates to the patch antenna array sensor of any preceding aspect, wherein patch antenna is integral to the ceramic matrix composite body.

A fourth aspect relates to the patch antenna array sensor of any preceding aspect further comprising an abradable layer.

A fifth aspect relates to the patch antenna array sensor of any preceding aspect further comprising a ground plane.

A sixth aspect relates to the patch antenna array sensor of any preceding aspect, wherein the ceramic matrix composite body is part of an engine shroud.

A seventh aspect relates to the patch antenna array of any preceding aspect, wherein the patch antenna array comprises a plurality of metallic antenna elements each of which comprises a metallic mesh.

An eighth aspect relates to a tip clearance sensor system comprising: a patch antenna array sensor comprising a patch antenna array, wherein the patch antenna array is embedded in a ceramic matrix composite body; a transceiver configured to transmit an excitation signal to the patch antenna array; and a processor configured to determine a blade tip clearance from a reflection of a transmission emitted by the patch antenna array.

A ninth aspect relates to the tip clearance sensor system of aspect 8, wherein the processor is configured to determine blade wear based on the reflection of the transmission emitted by the patch antenna array.

A tenth aspect relates to the tip clearance sensor system of any of aspects eight to nine, wherein the processor is configured to determine engine speed based on the reflection of the transmission emitted by the patch antenna array.

An eleventh aspect relates to the tip clearance sensor system of aspects eight to ten, wherein the processor is configured to determine engine torque based on the reflection of the transmission emitted by the patch antenna array.

A twelfth aspect relates to the tip clearance sensor system of aspects eight to eleven, wherein the processor is configured to detect a break in a shaft of a gas turbine engine based on the reflection of the transmission emitted by the patch antenna array.

A thirteenth aspect relates to the tip clearance sensor system of aspects eight to twelve, wherein the processor is configured to detect bearing wear based on the reflection of the transmission emitted by the patch antenna array.

A fourteenth aspect relates to the tip clearance sensor system of aspects eight to thirteen, wherein the transceiver is configured to receive a measurement signal from the patch antenna array.

A fifteenth aspect relates to a method comprising: causing a signal beam to radiate from a patch antenna array which is embedded in a ceramic matrix composite body; receiving a reflection of the signal beam off of a rotatable blade in a gas turbine engine; and determining a distance between the patch antenna array and a tip of the rotatable blade.

A sixteenth aspect relates to the method of aspect fifteen further comprising focusing the signal beam on the rotatable blade.

A seventeenth aspect relates to the method of any of aspects fifteen to sixteen wherein causing the signal beam to radiate comprises causing the signal beam to radiate from two patch antennas included in the patch antenna array.

An eighteenth aspect relates to the method of any of aspects fifteen to seventeen, wherein receiving the reflection of the signal beam comprises receiving the reflection of the signal beam by a patch antenna included in the patch antenna array.

A nineteenth aspect relates to the method of any of aspects fifteen to eighteen further comprising detecting an engine speed by sensing blades passing the patch antenna array.

A twentieth aspect relates to the method of any of aspects fifteen to nineteen further comprising detecting an overspeed condition based on detection of the engine speed.

In addition to the features mentioned in each of the independent aspects enumerated above, some examples may show, alone or in combination, the optional features mentioned in the dependent aspects and/or as disclosed in the description above and shown in the figures.

What is claimed is:

1. A tip clearance sensor system comprising:
a patch antenna array sensor comprising a patch antenna array, wherein the patch antenna array comprises a plurality of patch antennas and is embedded in a ceramic matrix composite body;
a transceiver configured to transmit an excitation signal to the patch antenna array and to thereby cause a signal beam to radiate from the patch antenna array; and
a processor configured to focus the signal beam on a rotatable blade in a gas turbine engine by setting a frequency and/or a phase angle of the excitation signal, wherein the patch antenna array is configured to receive a reflection of the signal beam off of the rotatable blade, wherein the transceiver is configured to receive a measurement signal from the patch antenna array, wherein the processor is configured to determine a distance between the patch antenna array and a tip of the rotatable blade by a processing of the measurement signal, wherein the processor is configured to determine the distance from a change in a modulation of the measurement signal as compared to a modulation of the excitation signal, wherein the shorter the distance between the patch antenna array and the tip of the rotatable blade, the greater the change in the modulation of the measurement signal from the modulation of the excitation signal.

2. The tip clearance sensor system of claim 1, wherein patch antenna is integral to the ceramic matrix composite body.

3. The tip clearance sensor system of claim 1, wherein the patch antenna array sensor further comprising an abradable layer.

4. The tip clearance sensor system of claim 1, wherein the patch antenna array sensor further comprising a ground plane.

5. The tip clearance sensor system of claim 1, wherein the ceramic matrix composite body is part of an engine shroud.

6. The tip clearance sensor system of claim 1, wherein the patch antenna array comprises a plurality of metallic antenna elements each of which comprises a metallic mesh.

7. The tip clearance sensor system of claim 1, wherein the processor is configured to determine blade wear based on the reflection of the signal beam off of the rotatable blade.

8. The tip clearance sensor system of claim 1, wherein the processor is configured to determine engine speed based on the reflection of the signal beam off of the rotatable blade.

9. The tip clearance sensor system of claim 1, wherein the processor is configured to determine engine torque based on the reflection of the signal beam off of the rotatable blade.

10. The tip clearance sensor system of claim 1, wherein the processor is configured to detect a break in a shaft of a gas turbine engine based on the reflection of the signal beam off of the rotatable blade.

11. The tip clearance sensor system of claim 1, wherein the processor is configured to detect bearing wear based on the reflection of the signal beam off of the rotatable blade.

12. A method comprising:
causing a signal beam to radiate from a patch antenna array which is embedded in a ceramic matrix composite body,
wherein causing the signal beam to radiate comprises transmitting an excitation signal to a plurality of patch antennas included in the patch antenna array,
wherein the signal beam is focused on a rotatable blade in a gas turbine engine by setting a frequency and/or a phase angle of the excitation signal with a processor;
receiving a reflection of the signal beam off of the rotatable blade at the patch antenna array;
receiving a measurement signal at the processor from the patch antenna array; and
determining a distance between the patch antenna array and a tip of the rotatable blade by processing the measurement signal with the processor,
wherein the distance is determined by the processor from a change in a modulation of the measurement signal as compared to a modulation of the excitation signal,
wherein the shorter the distance between the patch antenna array and the tip of the rotatable blade, the greater the change in the modulation of the measurement signal from the modulation of the excitation signal.

13. The method of claim 12 further comprising detecting an engine speed by sensing blades passing the patch antenna array.

14. The method of claim 13 further comprising detecting an over-speed condition based on detection of the engine speed.

15. The method of claim 12 further comprising detecting wear of the rotatable blade based on a difference between the determined distance and an expected distance.

16. The method of claim 12 further comprising compensating for parasitic effects by analyzing differences in the measurement signal detected at different excitation frequencies.

* * * * *